(12) United States Patent
Bhat et al.

(10) Patent No.: US 9,696,933 B2
(45) Date of Patent: Jul. 4, 2017

(54) VIRTUAL MACHINE MANAGER INITIATED PAGE-IN OF KERNEL PAGES

(71) Applicant: International Business Machines Corporation, Armonk, NY (US)

(72) Inventors: Suma M. B. Bhat, Bangalore (IN); Chetan L. Gaonkar, Kumta (IN); Keerthi B. Kumar, Bangalore (IN); Deepak L. Ranganath, Columbus, OH (US)

(73) Assignee: International Business Machines Corporation, Armonk, NY (US)

( * ) Notice: Subject to any disclaimer, the term of this patent is extended or adjusted under 35 U.S.C. 154(b) by 117 days.

(21) Appl. No.: 14/460,413

(22) Filed: Aug. 15, 2014

(65) Prior Publication Data

US 2016/0048401 A1 Feb. 18, 2016

(51) Int. Cl.
*G06F 12/00* (2006.01)
*G06F 13/00* (2006.01)
(Continued)

(52) U.S. Cl.
CPC .......... *G06F 3/064* (2013.01); *G06F 3/0604* (2013.01); *G06F 3/0665* (2013.01);
(Continued)

(58) Field of Classification Search
CPC .......... G06F 9/45533; G06F 9/45537; G06F 9/45541; G06F 9/45545; G06F 9/4555;
(Continued)

(56) References Cited

U.S. PATENT DOCUMENTS

| 7,395,405 B2 | 7/2008 | Anderson et al. |
| 7,702,843 B1 | 4/2010 | Chen et al. |

(Continued)

FOREIGN PATENT DOCUMENTS

| JP | 2010170210 A | 8/2010 |
| WO | 2010060791 A1 | 6/2010 |

OTHER PUBLICATIONS

Speculative Memory Checkpointing; Vogt et al; Proceedings of the 16th Annual Middleware Conference; Dec. 7-11, 2015; pp. 197-209 (13 pages).*

(Continued)

*Primary Examiner* — Daniel C Chappell
(74) *Attorney, Agent, or Firm* — David B. Woycechowsky

(57) ABSTRACT

A rule-based method for pre-fetching "important pages" from memory paging space back into kernel memory space performs the following steps: (i) establishing a first machine logic based rule, with the machine logic based rule including a first triggering condition and a first consequential responsive action; (ii) determining that the first triggering condition has occurred; and (iii) in response to the determination that the first triggering condition has occurred, performing the first consequential responsive action. The first triggering condition includes the following sub-conditions: (i) at least one of a first set of important page(s) of a computer system has been paged out of kernel memory space and into paging memory space, and (ii) a processing status of the computer system indicates that the first set of important page(s) will be likely to be required for computer operations.

3 Claims, 5 Drawing Sheets

(51) Int. Cl.
  *G06F 13/28* (2006.01)
  *G06F 3/06* (2006.01)
  *G06F 9/455* (2006.01)
  *G06F 12/02* (2006.01)
  *G06F 9/50* (2006.01)

(52) U.S. Cl.
  CPC ........ *G06F 3/0673* (2013.01); *G06F 9/45558* (2013.01); *G06F 9/50* (2013.01); *G06F 12/02* (2013.01); *G06F 2009/45583* (2013.01)

(58) Field of Classification Search
  CPC .... G06F 9/45554; G06F 9/45558; G06F 9/50; G06F 9/5061; G06F 9/5077; G06F 2009/45583
  USPC ........................................................ 711/158
  See application file for complete search history.

(56) References Cited

U.S. PATENT DOCUMENTS

| | | | |
|---|---|---|---|
| 8,261,265 B2 | 9/2012 | Chen et al. | |
| 8,499,138 B2 | 7/2013 | Accapadi et al. | |
| 8,539,186 B2 | 9/2013 | Sechrest et al. | |
| 8,561,061 B2 | 10/2013 | Adams et al. | |
| 9,052,990 B2 | 6/2015 | Joseph et al. | |
| 2005/0228964 A1* | 10/2005 | Sechrest | G06F 12/122 711/170 |
| 2006/0004977 A1* | 1/2006 | Jann | G06F 12/127 711/170 |
| 2006/0005084 A1* | 1/2006 | Neiger | G06F 9/45533 714/47.1 |
| 2008/0307188 A1* | 12/2008 | Franaszek | G06F 9/5016 711/171 |
| 2009/0055693 A1 | 2/2009 | Budko et al. | |
| 2012/0060012 A1* | 3/2012 | Olszewski | G06F 12/1009 711/171 |
| 2012/0198284 A1* | 8/2012 | Li | G06F 11/362 714/42 |
| 2013/0097355 A1 | 4/2013 | Dang et al. | |
| 2013/0132637 A1 | 5/2013 | Kumar et al. | |
| 2014/0143507 A1* | 5/2014 | Maria Joseph | G06F 12/1491 711/147 |

OTHER PUBLICATIONS

Hepkin, David, "Overview of AIX page replacement", Jan. 8, 2008, <http://www.ibm.com/developerworks/aix/library/au-vmm/>.

"About the Virtual Memory System", Copyright © 2003, 2013 Apple Inc. All Rights Reserved, Updated Apr. 23, 2013, <https://developer.apple.com/library/mac/documentation/performance/conceptual/managingmemory/articles/aboutmemory.html>.

Bhat et al., "Virtual Machine Manager Initiated Page-In of Kernel Pages", U.S. Appl. No. 14/986,975, filed Jan. 4, 2016.

Appendix P—List of IBM Patents or Patent Applications Treated as Related. 2 pages.

* cited by examiner

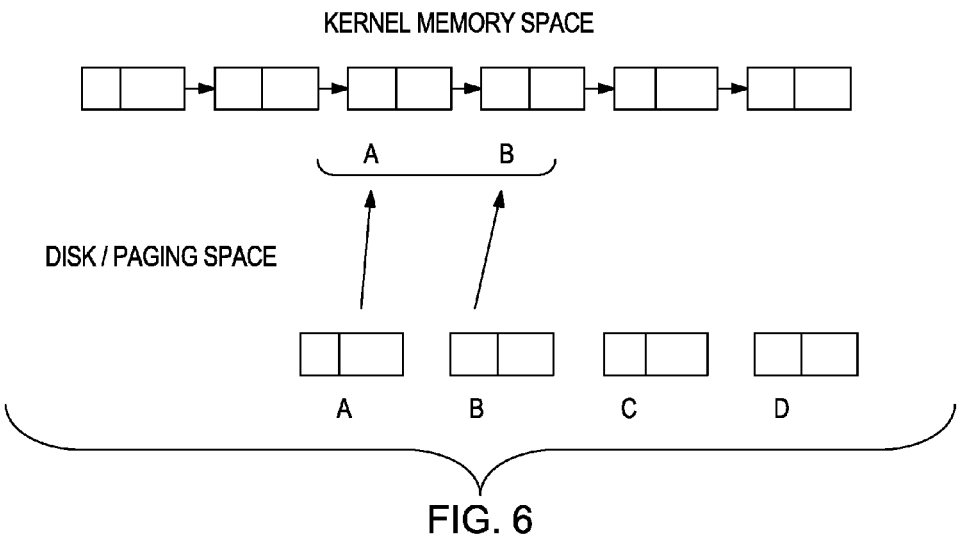
FIG. 6
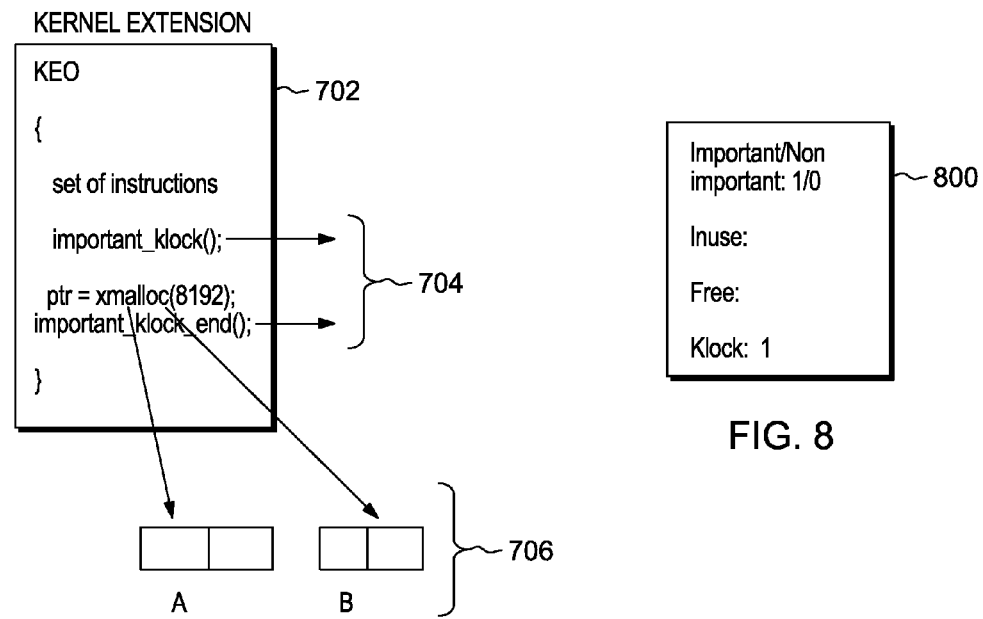
FIG. 7
FIG. 8

VIRTUAL MACHINE MANAGER INITIATED PAGE-IN OF KERNEL PAGES

BACKGROUND OF THE INVENTION

The present invention relates generally to the field of kernel pages, and more particularly to "page-in" operations for kernel pages.

As of this writing, the "page (memory)" webpage at the Wikipedia website discloses as follows: "A page, memory page, or virtual page is a fixed-length contiguous block of virtual memory, and it is the smallest unit of data for the following: memory allocation performed by the operating system for a program; and transfer between main memory and any other auxiliary store, such as a hard disk drive. Virtual memory allows a page that does not currently reside in main memory to be addressed and used. If a program tries to access a location in such a page, an exception called a page fault is generated. The hardware or operating system is notified and loads the required page from the auxiliary store (hard disk) automatically. A program addressing the memory has no knowledge of a page fault or a process following it. Thus a program can address more (virtual) RAM than physically exists in the computer. Virtual memory is a scheme that gives users the illusion of working with a large block of contiguous memory space (perhaps even larger than real memory), when in actuality most of their (sic) work is on auxiliary storage (disk). Fixed-size blocks (pages) or variable-size blocks of the job are read into main memory as needed. A transfer of pages between main memory and an auxiliary store, such as a hard disk drive, is referred to as paging or swapping."

Kernel memory has been configured as pageable so that particular operating systems (OSs) can work in small memory systems. In such systems, kernel data structures may be paged out to a paging space on a secondary computer-readable storage medium in a manner similar to the paging of user-space data. In an OS with a pageable kernel, the kernel data structures that are not pinned in memory and can be paged out to the paging space just like the user-space data. Typically, these kernel pages will be paged out, when no other option is left but to page the kernel data out. Conventionally, kernel pages are paged out relatively infrequently because a typical "order of stealing" specified in a typical LRU (Least Recently Used) cache is as follows (in descending order of preference to page out): (i) file pages; (ii) working segment pages and modified file pages; (iii) encrypted file system pages (relatively low preference for page out to avoid excessive encryption and decryption); and (iv) pageable Kernel and Kernel extensions' data structures. The paged out data is paged into main memory, when there is some demand for that data (for example, demand for further access).

SUMMARY

According to an aspect of the present invention, there is a method, system and/or computer program product that performs the following steps (not necessarily in the following order): (i) establishing a first machine logic based rule, with the machine logic based rule including a first triggering condition and a first consequential responsive action; (ii) determining that the first triggering condition has occurred; and (iii) in response to the determination that the first triggering condition has occurred, performing the first consequential responsive action. The first triggering condition includes the following sub-conditions: (i) at least one of a first set of important page(s) of a computer system has been paged out of kernel memory space and into paging memory space, and (ii) a processing status of the computer system indicates that the first set of important page(s) will be likely to be required for computer operations. The first consequential responsive action includes, for any important page of the first set of important page(s) not present in kernel memory space, paging that important page from paging memory space back into kernel memory space.

BRIEF DESCRIPTION OF THE DRAWINGS

FIG. 6 is a block diagram view of a portion of the second embodiment system;

FIG. 7 is a block diagram view of a portion of the second embodiment system; and FIG. 8 is a block diagram view of a portion of the second embodiment system.

DETAILED DESCRIPTION

Figure 1:
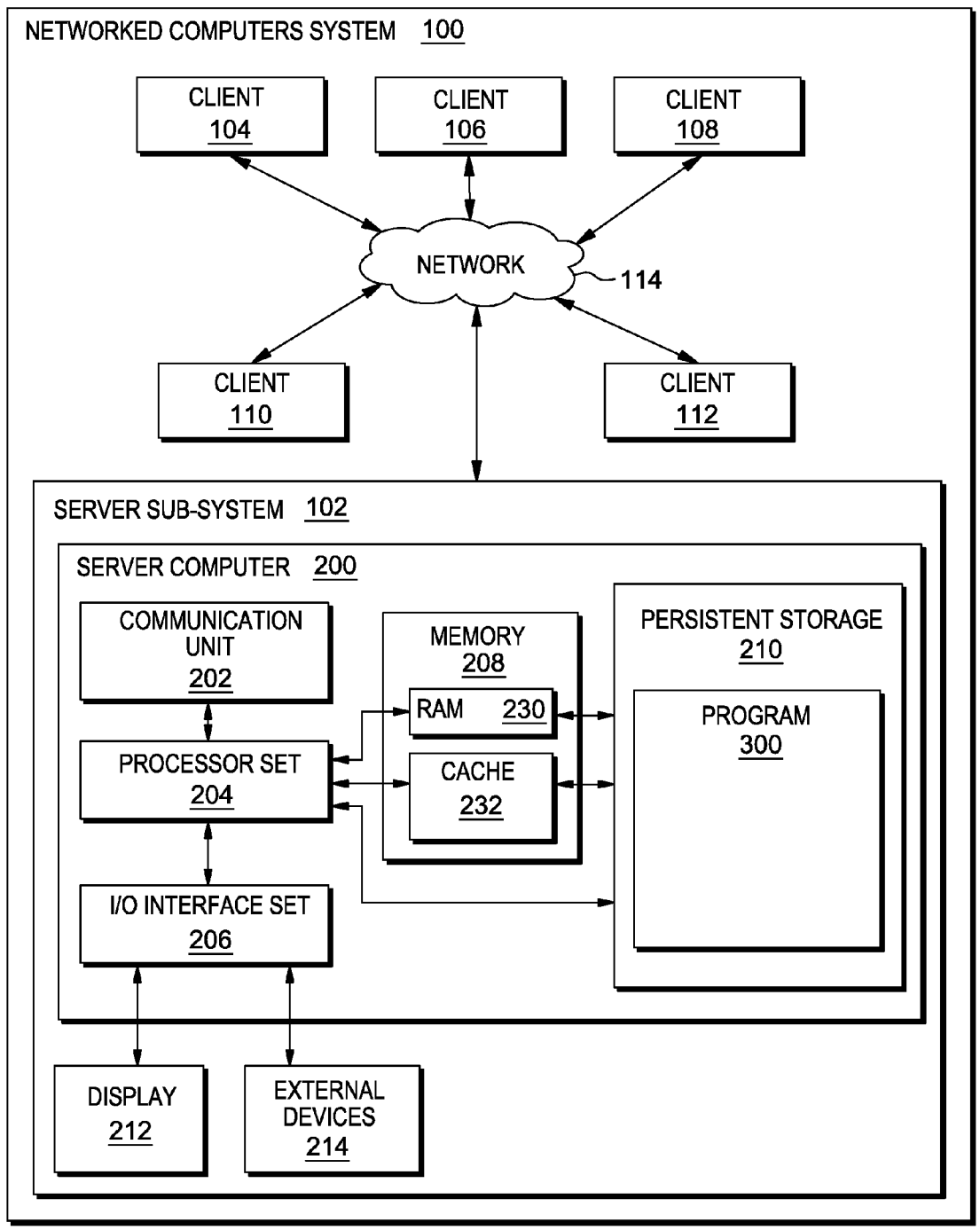
FIG. 1 is a block diagram view of a first embodiment of a system according to the present invention.

Some embodiments of the present invention include a rule-based method for pre-fetching "important pages" (see definition in Definitions section) from memory paging space back into kernel memory space. The identification of which "important pages" are designated by a given rule depends upon that rule's triggering condition, which, in turn, depends upon the operational status of the computer system. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. Example Embodiment

Figure 2:
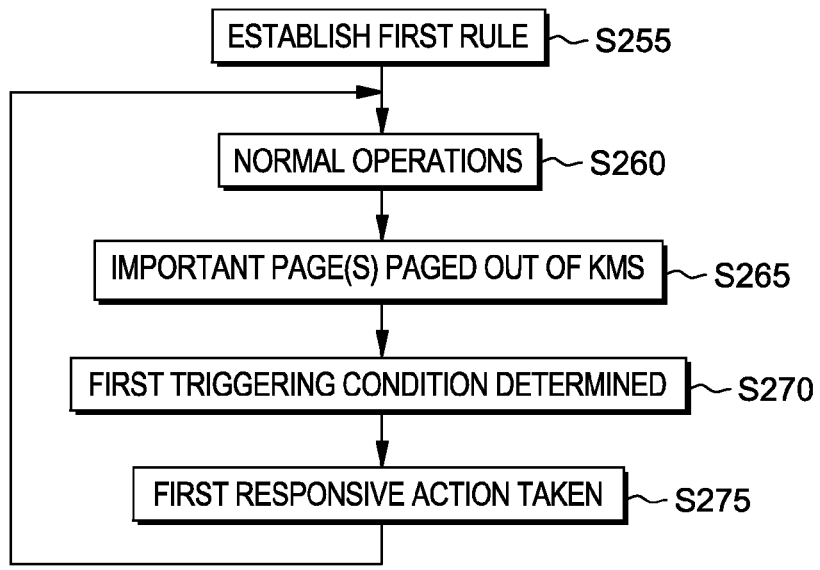
FIG. 2 is a flowchart showing a method performed, at least in part, by the first embodiment system.
Figure 3:
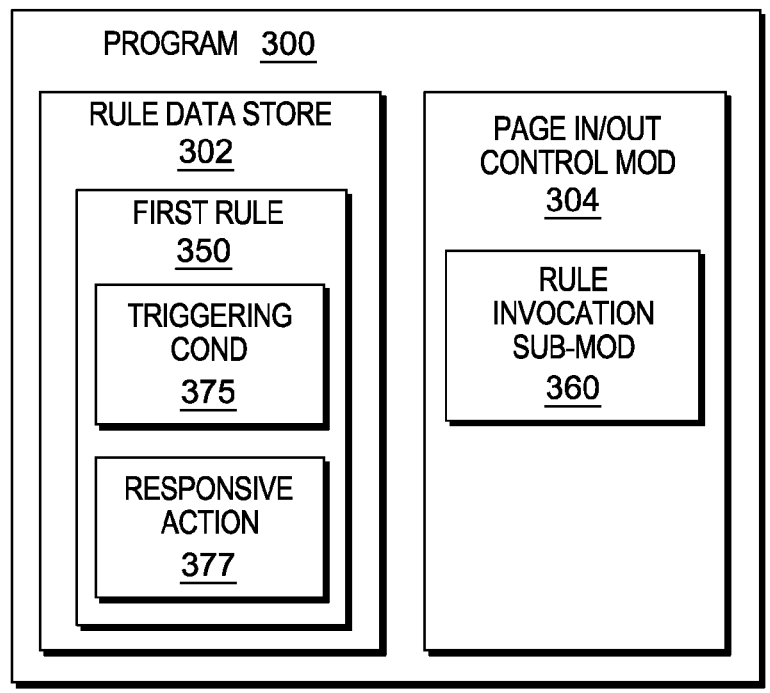
FIG. 3 is a schematic view of a machine logic (for example, software) portion of the first embodiment system.

FIG. 2 shows flowchart 250 depicting a method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where first pre-fetch rule 350 is established by storing the first rule in rule data store 302. As shown in FIG. 3, first pre-fetch rule 350 includes triggering condition 375 and responsive action 377.

Processing proceeds to step S260, where normal operations of server sub-system 102 (see FIG. 1) occur. During these normal operations, pages that tend to be important for normal operations are maintained in kernel memory space, which, in server computer 200, is located in processor set 204. Kernel memory pages are the pages which are utilized by the operating system (kernel) like an application program uses its user space memory. This kernel memory is created and destroyed based on the workload and type of operation the kernel should do in behalf of applications. In this embodiment, the kernel is part of RAM 230 (see FIG. 1). Some of the kernel memory pages are pinned and some of them are pageable.

Processing proceeds to step S265, where memory pressure on the kernel memory space becomes high, so that pages that tend to be important for normal operations are paged out of the kernel memory space and into a paging memory space by page in/out control module ("mod") 304. In this embodiment, the paging memory space is located in RAM 230 and/or cache 232. Paging space is located in persistent storage 210 (see FIG. 1). Paging space is a location where the least recently used pageable pages are stored temporarily until the time such data is accessed by program 300 or by the kernel (located in RAM 230). Step S265 is a step that also occurs in currently conventional computers.

Processing proceeds to step S270, where rule invocation sub-mod 360 of page in/out control mod 304 determines that triggering condition 375 of first pre-fetch rule 350 has been met by the status of operations of server computer 200. In this example, triggering condition 375 includes two sub-conditions as follows: (i) a predetermined processing situation exists which indicates it is likely that a certain set of "important pages" will be needed to be in the kernel memory space; and (ii) at least one of the "important pages" of triggering condition 375 is not present in the kernel memory space (KMS). Some examples of predetermined processing situations that may lead to a rule-based pre-fetch according to various embodiments of the present invention will be discussed in the following sub-section of this detailed Disclosure section.

Processing proceeds to step S275, where rule invocation sub-mod 360 of page in/out control mod 304 causes responsive action 377 of first pre-fetch rule 350 to occur. In this example, the responsive action is as follows: any "important pages" designated by the pre-fetch rule that are not present in the KMS are paged into the KMS from paging memory space.

III. Further Comments and/or Embodiments

Some potential problems and/or potential areas for improvement with respect to the current state of the art will now be discussed with reference to some examples of how kernel page in and/or page out conventionally operates. In this example, important pages of kernel and kernel extensions data structures (for example, a heart beat daemon page, VMM (virtual memory manager) and it sub-component's pages) are stolen when the following conditions are applicable: (i) when the memory pressure is extremely high; and (ii) other lower LRU (least recently used) order pages are not left for stealing. In this example, at some later point in time, when memory utilization comes back to a normal state, important pages of the kernel, and kernel extensions data structures that were already paged out previously, will be present in paging space until the operating system (OS) page faults on them again. For purposes of this document, "stolen" means the same thing as "paged out." Due to the high memory pressure the operating system has to remove some unwanted or currently not required pages from the memory in order to retain the working set (currently needed pages) or new page demands of the currently executing user and/or kernel process(es). Stolen pages are put to paging space, with the external device configured to store temporary data of the user process or kernel process, as will be appreciated by those of ordinary skill in the art.

Even though conventional VMMs are (at least sometimes) capable of predicting a need for paged-out pages before they are actually needed, these important paged-out kernel pages are conventionally kept in paging space. Pages are located in "paging space" after they have stolen and moved back to RAM when they are required by the program again. This indicates these previously stolen pages are currently considered as a working set of the process, as will be appreciated by those of skill in the art. As an example of this VMM capability, a conventional VMM determines in advance when a kernel page's sub components will be invoked or will work actively. For example, PSMD (page size management Daemon) will be invoked when the number of 64K pages, or 4K pages, falls below a minimum threshold. PSMD (which is considered as critical in at least some embodiments of the present invention) is a VMM daemon which will run when the number of 64K pages, or 4K pages, falls below a minimum threshold. When a kernel/user process demands more for 64K pages and VMM is unable to meet this demand due to lack of 64K pages, it will invoke PSMD to convert 4K pages into 64K pages. 4K pages are input to PSMD daemon to covert them to 64K pages.

The operative machine logic determines that there is input demand for 4K pages that can't be paged out or already paged out pages can be bought in. Note: 64K pages is contiguous 16 4K pages. In this embodiment, because a "best" 4K set (16 4K pages per set) has already been identified, it is better to bring these eligible sets, or one of the pages in the eligible sets, back into memory once the VMM predicts that PSMD daemon will be invoked for page promotion (that is, 4K to 64K pages). Similar machine logic control is used for page demotion that is from (64K pages to 4K pages). LRUD (Least Recently used daemon) will be invoked when free pages fall below a minimum threshold.

To clarify a bit on user/kernel pages in preparation for the discussion of the following paragraph: (i) user pages are created in the user process (applications) address space and the address space itself is managed by the kernel on behalf of the user process (applications); and (ii) kernel pages are created by the kernel itself that is like pages of LRU daemon, PSMD Daemon, VMM pages and address space management (kproc-Kernel process).

In some embodiments of the present invention, the processing of user pages may include operations such as the following: allocation, deallocation, page-in, page-out, promotion, demotion and segment management. This processing of user pages is performed by the VMM and its core sub-components. In order to manage user applications and/or user pages, the VMM and its sub-components access their own data structures based on the operations (stealing, freeing, segment management, promotion, demotion, page out, page in) that are accomplished on those user pages/kernel pages. This operational dependency of the kernel on data structures (used by the VMM and its core sub-components in specified situations) are conventionally not considered in the machine logic (for example, software) that conventionally controls page-in methods. The conventional method of "on-demand page-in" (that is, access when required) will not necessarily work well for the core kernel data structures upon which a kernel has a relatively high level of dependency. It is believed that on-demand page-in can result in one, or more, of the following issues: (i) crash and/or time-out of important daemons due to latency; and/or (ii) backtracking performance issues. These two types of issues will be respectively discussed in the following two paragraphs.

With respect to type (i) issues, consider a scenario where important kernel data structures used by the heartbeat demon and/or real time processes (kernel extensions), are paged out at memory requirement peaks. The heartbeat demon and/or real time processes may time out or crash because of latency involved in resolving the kernel page faults.

With respect to type (ii) issues, several data structures and tables used by the VMM and its sub-components (PSMD, LRU, and segment control management unit) are pageable. This reduces the amount of real memory required. The VMM and its sub components may need to reference the contents of these pageable data structures while doing critical operations. It is entirely possible for the VMM and its sub components to encounter a page fault itself while trying to access its own data. This is known as a backtracking exception. In this case, the VMM: (a) releases the score board locks held by critical operations previously being performed; (b) resolves the page fault caused by trying to access its own data structures; and (c) backtracks to whatever it was originally doing (for example, critical operations). This process is repetitive in nature, if pages accessed in each line of critical code are not resident in memory.

As an example of a backtracking exception, assume that a VMM needs software, a hash anchor table, and an XPT (external page table) root to resolve a page fault caused by the PSM daemon. This means it is entirely possible for the VMM itself to encounter a new page fault while trying to access its software anchor table and XPT root, or XPT direct data block, as part of the process of resolving the original page fault caused by the PSMD. In this case, the VMM must first resolve the page fault caused by the VMM accessing its own data structures, and then backtrack to the original page that faulted when attempted to be accessed for resolving the page fault caused by the PSMD.

LRU code showing an example of the backtracking problem follows:

```
line no 1
   2
   .
   .
   .
   22     mst ->back_track =1    /* backtrack exception
          enabled from line 22 to 55 . Indicate that it is VMM critical
          code and backtrack need to be done if any data structures
          required is not memory residence */
   23
   24
   25
   .
   .
   .
   55     mst ->back_track = 0
```

In this example LRU code, if line 23 accesses a VMM/LRU data structure that is not resident in memory, then the VMM/LRU data structure will: (i) release all the score board locks held by previous critical operations; and (ii) handle this page fault. To resolve this page fault, the software conventionally accesses the XPT root structure of the segment corresponding to the page that is being accessed to determine the location where this page is saved in paging space. However, if this XPT root is not present, then the result is another page fault. Once the data structure required by VMM/LRU thread becomes available, then the VMM/LRU thread will back track to original work. It may again page fault if any of the data structures accessed, in the process of executing line numbers 24 to 54 of the LRU code set forth above, are not present in memory.

In some embodiments of the present invention pages having relatively high importance are paged out when memory usage is high, and they are paged in when one of the following conditions is met: (i) the memory usage becomes steady; and/or (ii) kernel dependency of such pages at different identifiable situations is not considered resulting in above mentioned drawbacks. Some possible "identifiable situations" will now be identified. LRU running to manage free space in RAM (when number of free pages are less than minfree threshold). This reaching of minfree is an identifiable situation from VMM perspective and once it is identified that LRU will run, VMM can bring back LRU and its related pages in advance instead of back tracking again and again. Also PSMDs Page promotion (4K-64K) is another identifiable situation where in the input pages required for this promotion (Best 4K page set) and page promotion related pages itself. Also, PSMDs Page Demotion (64K-4K) is another identifiable situation where in the input pages required for this Demotion (Best 64K page set) and page demotion related pages itself.

Figure 4:
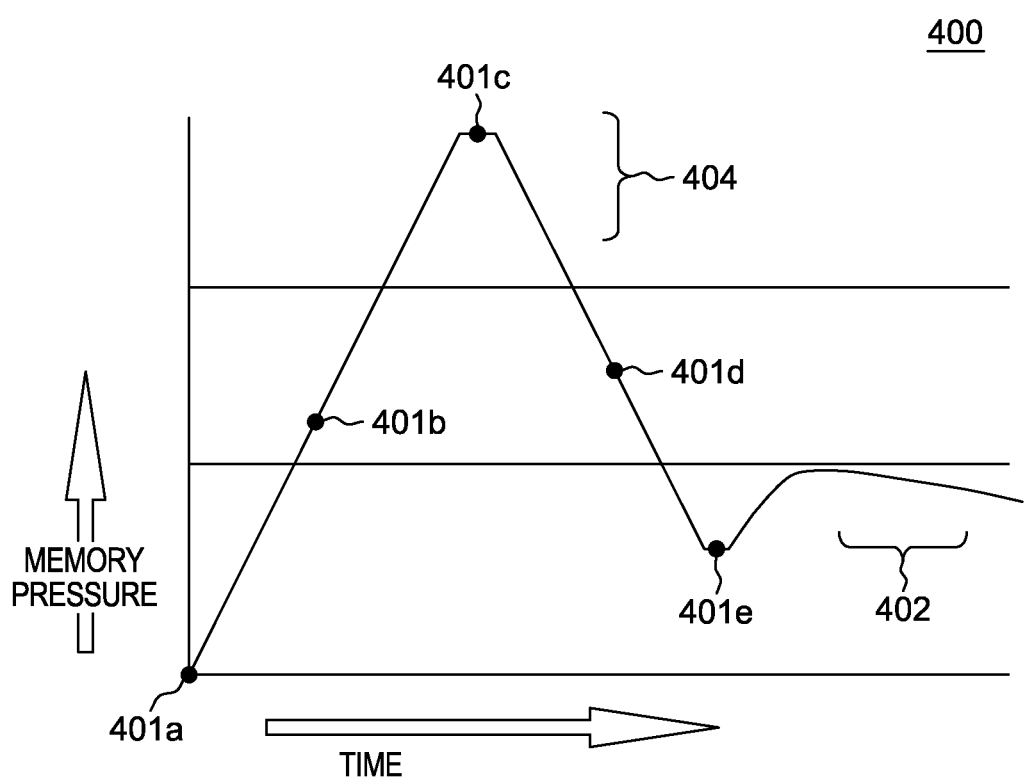
FIG. 4 is a graph helpful in explaining some embodiments of the present invention.

As shown in FIG. 4, graph 400 shows how currently conventional kernel page in/out works. Graph 400 includes: a vertical axis (that is, the memory pressure axis); a horizontal axis (that is, the time axis); pressure versus time curve 401 (including points 401a to 401e and curve ranges 402, 404). While graph 400 shows how currently conventional operations work, the explanation of graph 400 in the following paragraph will include comments about how some embodiments of the present invention are different than these currently conventional operations.

An explanation of curve 401 of graph 400 is as follows: (i) at time t0 (that is, point 401a) the memory pressure is quite low so no pages have been paged out of the kernel space and into the paging space; (ii) at time t1 (that is, point 401b) the memory pressure has increased so that some pages are paged out of the kernel, but not relatively important pages (for example, klock pages); (iii) at time t2 (that is point 401c) and all through range 404, memory pressure has risen to such a high level that paging out has started for relatively important pages (such as klock pages); (iv) at time t3 (that is, at point 401d) memory pressure on the kernel space has fallen so that some embodiments of the present invention will page back in relatively important pages previously paged out; (v) at time t4 (that is, at point 401e) the memory pressure is quite low and some embodiments of the present invention will start to (or continue to) page back in relatively important pages into kernel space; and (vi) in range 402, backtracking page fault is high and critical applications (for example, a heartbeat daemon) take a relatively large amount of time for page access because relatively important pages (for example, klock pages) have previously been paged out during time range 404. Some embodiments of the present invention avoid the problems (high backtracking page fault, slow operation of heartbeat daemon) of item (vi) because the relatively important pages are paged back in to the kernel memory space at points 401d and/or 401e. More specifically, various embodiments of the present invention may set different thresholds for paging important pages back in. However, once memory pressure falls below this threshold, the relatively important pages will be paged back in, even in advance of an actual, present and immediate need for the relatively important page.

Example(s) will now be discussed. PSMD related data structures are needed, when a VMM wants to balance between 64K and 4K pages (that is, the 64K/4K pages minimum threshold is reached). LRU related data structures are needed, when VMM wants to increase free page to threshold level (start when free memory pages reached minimum free threshold). XPT root, XPT direct data block, XPT indirect data block of the specified segment is needed in the same order as mentioned, while handling page fault of any page in that segment.

Some embodiments of the present invention may include one, or more, of the following features, characteristics and/or advantages: (i) identifies "important pages" (see definition, below, in the DEFINITIONS section) with respect to a VMM including VMM sub-components; and (ii) creates groups of "important pages" based on their relative importance in the context of certain sets of circumstances (also called "page-selection-related situations" or PSR situations) that commonly arise. By defining PSR situations, rule-based approaches can be developed for responding to the PSR situations (generally, according to the present invention, by paging in. Further with respect to item (ii), some examples of PSR situations, and associated PSR rules will be respectively discussed in the following several paragraphs.

FIRST PSR RULE: the "triggering condition" for this rule is that backtrack exception(s) are generated during page fault on behalf of VMM, PSMD and/or LRUD sub-systems. When this triggering condition is met, then the machine logic of some embodiments of the present invention respond by performing the following "consequential responsive action(s)": the mapping or association between the corresponding situation, important pages required in that situation based on their page priority (kernel pages, klock pages, non-klock pages and application pages) and metadata (XPT root, XPT Direct and XPT indirect) required to page in these important pages are analyzed to bring back the pages into the main memory in advance to avoid backtracking issues of demand paging. These associations are built in a timely manner based on the previous backtracking issues which happened in that particular situation so that backtracking will reduce as time passes. For example: PSMD has two situations: (a) 4K to 64K (Page promotion); and (b) 64K to 4K (Page Demotion). This embodiment identifies these two situations and when these situations occur, VMM will identify access pattern and back tracking pattern and record them in their respective association table. In the future, the VMM can better predict page promotion (that is 4K to 64K) pages. The association table for this situation is analyzed and brings those required pages in advance if they have already paged out.

SECOND PSR RULE: the "triggering condition" for this rule is that backtrack exception(s) are generated during page fault on behalf of Device Drivers and/or Kernel Extensions that are registered with the VMM sub-system. When this triggering condition is met, then the machine logic of some embodiments of the present invention respond by performing the following "consequential responsive action(s)": important pages required in that situation based on their page priority (kernel pages, klock pages, kernel extension pages, device driver pages, application pages) and metadata (XPT root, XPT Direct and XPT indirect) required to page in these important pages are analyzed to bring back those pages into the main memory in advance to avoid backtracking issues of demand paging. These associations are built in a timely manner based on the previous backtracking issues which happened in that particular situation so that backtracking will reduce as time passes. If the second PSR triggering condition occurs at the same time with another system (VMM and its sub component) triggering condition, then the second PSR rule will be skipped, in case there is not enough memory to support at that instance. For example, during the initialization of the device driver it will register with the kernel or VMM in the below mentioned manner: (a) register with kernel/VMM about some of the important Device driver situations (for example, functions to be tracked, and page importance in the specified situation); and (b) register the entire kernel extension/device driver with VMM. In this case the kernel has to dynamically identify the situations and pages required in that situation by analyzing the data access pattern, Function invocation and back tracking pattern. VMM will create and use an association table as mentioned above.

THIRD PSR RULE: the "triggering condition" for this rule is that LRU critical code is executed when free page count drops below a predetermined minimum free threshold. When this triggering condition is met, then the machine logic of some embodiments of the present invention respond by performing the following "consequential responsive action(s)": important pages required in that situation based on their page priority (kernel pages, LRU pages and pages required by the LRU daemon, klock pages, kernel extension pages, device driver pages, application pages) and metadata (LRU metadata, XPT root, XPT direct and XPT indirect) required to page in these important pages are analyzed to bring back those pages into the main memory in advance to avoid backtracking issues of demand paging. These associations are built in a timely manner based on the previous backtracking issues which happened in that particular situation so that backtracking will reduce as time passes. For example, LRU will be invoked when system free pages falls below a minimum threshold. This is an identifiable situation from VMM perspective. The association table is created and managed based on the page accessed during LRU algorithm execution, that is, LRU data structure and meta data pages required to page in those pages.

FOURTH PSR RULE: the "triggering condition" for this rule is that PSMD daemon code is executed when free page count of 64K, or 4K, page pages drops below a predetermined watermark. When this triggering condition is met, then the machine logic of some embodiments of the present invention respond by performing the following "consequential responsive action(s)": same actions discussed above in connection with the FIRST PSR RULE.

Some embodiments of the present invention perform the following method: (i) create a framework in VMM to foresee such PSR situations, and/or triggering conditions for PSR rules, in advance; and then (ii) invoke "VMM self page in kernel daemon" to page-in the pages that are required at that specific PSR situation.

In some embodiments of the present invention, if a back track operation occurs during any specific PSR situations, then the data structures (that is, page—see definition of "page" below in the DEFINITIONS sub-section of this Detailed Description section) responsible for that back track operation are recorded.

In some embodiments of the present invention, validation of pages that are brought into main memory is performed by a "VMM self page-in kernel daemon," discussed herein. Main memory is RAM and based on the specifics of the PSR situation and associations, machine logic control brings some pages into main memory. This self-page-in is by recording the update in the association table.

In some embodiments of the present invention additional components (for example, kernel extensions, DD (device drivers)) register with a VMM in order to obtain benefits of a self-page-in facility for "important pages."

Some embodiments of the present invention may include one, or more, of the following features, characteristics and/or advantages: (i) reduction in back tracking resulting from operation of a VMM and its sub-components (for example, PSMD, LRU, DR) will be reduced; (ii) increased performance of VMM and it sub-components; (iii) enhancement of performance of a currently running application; (iv) reduction in crashes; (v) reduction in time out operations of heartbeat demon; (vi) reduction in time out operations of real time processes; (vii) decreased latency in resolving the page-faults of "important pages;" and/or (viii) identification of situational based importance of the pages can reduce memory pressure.

Some embodiments of the present invention perform the following steps (not necessarily in the following order): (i) identify "important pages" associated with a VMM (including its sub-components); (ii) group the "important pages" into different groups based on the respective roles that these "important pages" play in various PSR situations; (iii) provide machine logic, in the VMM that is programmed to detect and/or "PSR triggering conditions" and to responsively invoke "PSR consequential responsive actions;" (iv) if any back track happens during a PSR situation, then, in response, the pages responsible for the back track operation will be recorded; (v) validation of pages that are brought into main memory by our "VMM self-page-in kernel daemon;" and (vi) registration of additional components (kernel extensions, DD) with the VMM to obtain benefits of self-page-in facility for its "important pages." Further with respect to step (iii), one example of a PSR consequential responsive action is when a "VMM self-page-in kernel daemon" commands page-in of the pages that are helpful in responding to the specific PSR situation that exists (which is to say the PSR situation whose PSR triggering condition was detected and/or foreseen).

Further with respect to step (iv) of the previous paragraph, through the validation, the following identifications are made: (a) 3i>Cross component data structures required at that situation (PSMD critical section may need VMM or LRU data structure); and (b) 3ii>not already identified important data structures.

An example of classification of "important pages," into groups will now be discussed. In this example, each group corresponds to a level of importance of the important pages in a given group. This example deals with LRUD-related important pages, and the groups of important pages are defined as follows: (i) level one means that the important page includes important XPT roots of the LRUD (there are XPT roots for each segment and this page is part of a PTA (page table area) segment); (ii) level two means that the page includes important XPT direct data blocks of LRUD (in some embodiments, these can't be accessed without accessing an XPT's roots and there may be multiple direct data blocks); (iii) level three means that the page includes an important XPT indirect data block (more specifically, each block includes the "page out" or "in memory information" about a page, which can't be accessed when specified XPT root and direct data block is accessed).

An embodiment of the present invention will now be discussed with reference to a VMM paging control system 500, which is shown in FIGS. 5 to 8. As shown in FIGS. 5 to 8, VMM paging control system 500 includes: important activity list block 502; PSMD block 504; LRUD block 506; DR block 508; KE (kernel extensions) block 509; PSMD code block 510; VMS create (segment create) path 511; repagination diagram 600 (see FIG. 6); important pages A, B; non-important pages C, D; kernel extension diagram 700 (see FIG. 7); kernel extension block 702; new system calls code 704; important page calls set 706; and page frame table-data structure block 800 (see FIG. 8).

As shown in diagram 600 of FIG. 6, page data structures A, B, C and D are pages of data which are stored in disk/paging space. Pages A and B are important pages, and, more specifically in this example, klock pages. Pages C and D are file and data pages that are not classified as "important pages" (see definition of "important pages," below, in the Definitions sub-section of this Detailed Description section). Pages A and B have been put into disk/paging space because at some point in the processing: (i) memory pressure rose to a high level; and (ii) all of the non-important pages available for paging-out of the kernel memory space had already been paged-out; and (iii) of the important pages in kernel memory space, pages A and B were considered as the most appropriate "important pages" to be paged out. This portion of operations is similar to how kernel memory space is managed in currently conventional systems.

Figure 5:
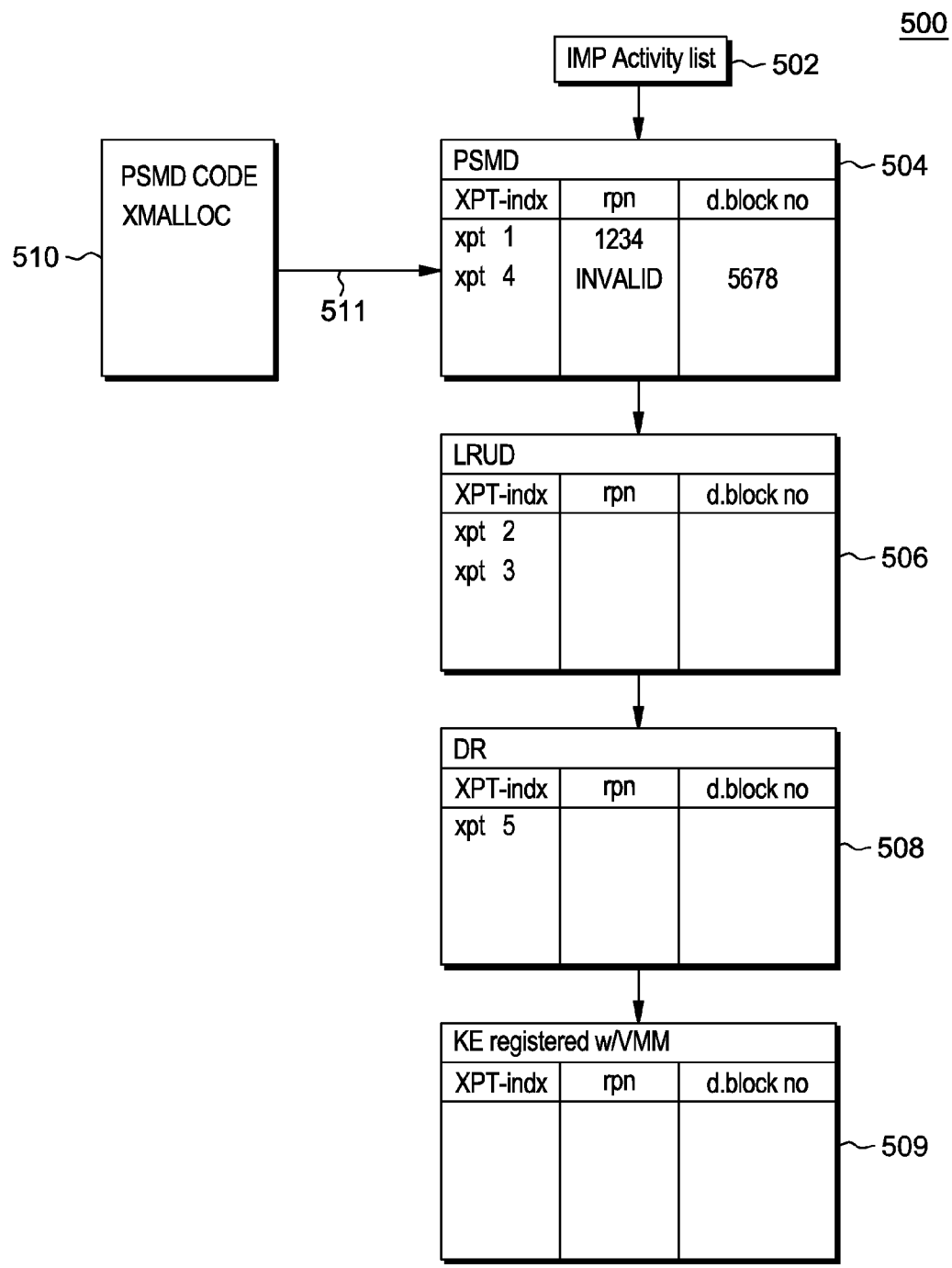
FIG. 5 is a block diagram view of a second embodiment of a system according to the present invention.

This embodiment of FIGS. 5 to 8 identifies certain pages (such as, klock pages) as being important or non-important based on operational dependency as shown in diagram 500 of FIG. 5. Example: to access important pages A and B, page D is required as it is the XPT root of the segment to which A and B also belongs to, and XPT root contains XPT direct X and XPT direct contains XPT indirect page Y. When VMM tries to access paged out page, the machine logic of the VMM performs the following steps if page A is already paged out : (a) access XPT root page D to get XPT direct block X; (b) retrieve the information from X about XPT indirect page Y; and (c) retrieve page A's information from page Y. When VMM tries to access paged out page A, VMM performs the following steps: (a) access XPT root page D to get XPT direct block X; (b) retrieve the information from X about XPT indirect page Y; and (c) retrieve page A's information from page Y. This indicates that D, X, Y are very important relative to an already-known important page A.

Situational-based "important pages" will now be discussed. Kernel memory space (see top half of FIG. 6) uses lot kernel segments for klock pages (which are generally considered as "important pages"). However, the processing context may make some klock pages more helpful, if re-paged-in early according to the present invention than other klock pages. In fact, the same is true of "important pages" generally—their relative importance with respect to early re-page-in depends upon circumstances, and these sets of circumstances that affect the choice of which important pages should be re-paged-in early are sometimes referred to herein as "PRS situations." System 500 of FIGS. 5 to 8 categorizes the important klock pages based on "PRS situations" by using PRS rules, where each PRS rule has a PRS triggering condition and PRS circumstantial consequential action(s). In this embodiment the PRS consequential action(s) generally take the form of prioritized re-page-in of important pages. In this embodiment, the PRS rules are as follows: (i) triggering condition is that PSMD is running, consequential responsive action is that pages needed for operations of PSMD are re-paged-in as soon as feasible in favor of re-page-in of other important pages; (ii) triggering condition is that LRUD is running, consequential responsive action is that pages needed for operations of LRUD are re-paged-in as soon as feasible in favor of re-page-in of other important pages; and (iii) triggering condition is that page fault handler is running, consequential responsive action is that pages needed for operations of the page fault handler are re-paged-in as soon as feasible in favor of re-page-in of other important pages.

The manner in which specified pages are classified as important klock pages, in the embodiment of system 500, will now be discussed. For each VMM and its sub-components (for example, PSMD, LRUD, DR, any KE registered with VMM for this facility), the VMM will monitor the segment allocation/page allocation and XPT (external page table) associated with the segment and page (that is, real page number (RPN)) used for storing this XPT info will be stored in specified sub-component's data structures shown in the diagram of system 500 in FIG. 5.

When LRU is about to steal the klock page, first it will search important activity list block 502 for an indication of the important klock page info. If search is successful, then that real page number is invalidated. (For example, the XPT of the PSMD thread that is paged out is indicated by the "xpt 4" legend in PSMD block 504).

FIG. 5 is an example of an association table creation by VMM. When VMM finds a critical activity (like, PSMD, LRU, or DR which is listed in important activity list 502) that is about to start, then VMM invokes self-page-in daemon with the name of the activity as an argument. VMM self-page-in daemon finds the pages that are already paged out for that activity using data stored in important activity list block 502 and then pages-in those pages. When the activity commences, VMM watches out for any back track event for that activity and then identifies the root cause page for that back track event and then includes them in the important activity list stored in block 502. Such information acts as a hint for self-page-in daemon for future occurrence(s) of the same activity.

As shown in FIG. 6, an auto-page-in daemon (not separately shown in diagram 600 of FIG. 6) pages-in pages A and B from paging space (lower half of FIG. 6) to memory (upper half of FIG. 6) because XPT index table important bit is set to 1 for pages A and B (see important bit information at diagram 800 of FIG. 8), but not other pages, such as pages C and D. As further shown in FIG. 6, new system calls are introduced, and the two pages A and B allocated by XMALLOC are considered as important klock pages. Important data required for faster response and non-availability of this data may result in a system crash.

As shown in FIG. 7, an additional method will now be discussed, where the page level support kernel extension identifies its important klock pages. An embodiment of this kind of method uses two system calls: important_klock_start and important_klock_end (see FIG. 7 at block 702). All the XMALLOC allocations (in this example, pages A and B) between these two calls are considered as important klock pages. In diagram 700, 8K bytes are allocated for this. The two 4K pages, A and B, are considered as important klock pages because non-availability of these two pages A and B for kernel extension 702 may result in a system crash. When the memory pressure is at a peak, important klock pages are paged out by LRUD. Then, whenever the memory pressure subsides KPROC self-page-in daemon (not separately shown in FIG. 7) will page-in the important klock pages.

As shown in FIG. 8, block 800 is a page frame table-data structure. Because the important bit field in block 800 is set to 1, this klock page will only be stolen by LRU when there are no other pages left to steal that have important bit set to 0.

Some embodiments of the present invention may include one, or more, of the following features, characteristics and/or advantages: (i) ways of identifying pages to be pre-fetched (that is, identification of "important pages") from a potentially huge amount of paged-out data; (ii) certain triggering conditions that will cause certain important pages to be pre-fetched; (iii) building an association between faulted page (that is, a page that is needed in memory, but not present in memory) and the page which contains the information of the faulted page (paging space metadata/XPT data, page fault handler data and code); (iv) description of the paging space metadata of a page is AIX External Page Table entry (XPT) (disk block descriptor in other UNIX flavors) to indicate a location in which the paged-out page is saved on a non-volatile storage medium; (v) in AIX, each segment (of size 256 MB) is mapped to a XPT and the XPT entry that represents paging space for a segment (65,536 pages) is called an "XPT ROOT;" (vi) the XPT ROOT points to 256 XPT DIRECT blocks; (vii) this XPT DIRECT block represents paging space information for 1 MB of memory (that is, 256 pages); (viii) paging space information of each data/text page can be fit in 128 bytes meaning that 8 pages are needed to hold 1 MB of data and each XPT DIRECT will have 8 entries that are pointing to 256 pages; (ix) the XPT entry (XPT Indirect) will contain paging space status (disk block status) of a single page of segment that is used by a specified process; (x) each segment will need 2048 pages as 1MB data requires 8 paging space metadata pages of size 4096 bytes; and/or (xi) this indirection mechanism is for better searching of paging space status (of a page) and/or loading of metadata based on the portion of the segment that is accessed.

Some embodiments of the present invention may include one, or more, of the following features, characteristics and/or advantages: (i) the binding and/or grouping of all pages containing paging space metadata (XPT root, XPT direct block, XPT entry that is required to page-in or page-out) with the corresponding data/text page; (ii) prevent needed metadata from being missing in memory while resolving the page fault of a specified data/text page to prevent a nested page fault (and associated backtracking), which degrades the performance of the system; (iii) binding and grouping the metadata with specified data/text page; and/or (iv) reduces back tracking in the kernel (as well as its huge associated cost) to zero.

A method according to the present invention includes the following steps: (i) release all the locks (score board locks—SCB locks, page locks) held while handling the previous page fault; (ii) start resolving the current page fault that has resulted due to paging space metadata unavailability (for example, XPT root unavailability) or unavailability of data structures (for example, structures required for page fault handler itself) while resolving the previous page fault; (iii) on condition that a nested page fault occurs while resolving the XPT DIRECT page that is obtained during step (ii), then repeat steps (i) and (ii) for the nested page fault; and (iv) on condition that a nested page fault occurs while resolving the XPT INDIRECT page that is obtained during step (iii), then repeat steps (i) and (ii) for the nested page fault.

Some embodiments of the present invention may include one, or more, of the following features, characteristics and/or advantages: (i) create a framework in VMM to foresee its critical situations in advance and identify data/text pages that are required in those situations; (ii) get the respective paging space metadata pages for the required data/text pages and build an association between them (critical situation, data/text pages required in that situation and their metadata); (iii) pre-fetching is applied to selected important pages by considering which important pages will not be freed during system up time instead of considering fruitless effort of all pages; (iv) increases the efficiency of VMM which results in high performance of processes, applications and kproc which are currently running; (v) invokes a "VMM self page-in-kernel-daemon" to page-in the pages that are required at that specific critical situation; (vi) the "VMM self-page-in kernel daemon" analyzes the critical situation's page associations and just accesses all the data/text pages that are present in memory to avoid page-out of such pages, based on the associated critical situation; (vii) an intelligent framework in "VMM self page in kernel daemon" for pre-fetching the paging space metadata; (viii) does not pre-fetch any metadata if all data/text page required in that situation are in memory because this means metadata will not be needed in the near future; and/or (ix) does not follow "default page-in/page-out resolution mechanism" for situations that are tracked by the VMM as part of our disclosure.

Further with respect to item (iii) in the list of the previous paragraph, pre-fetching is applied to selected important pages by considering the life time of the pages. This is another factor that is considered, in this embodiment, when identifying the important pages from the list of all kernel pages. The operating system creates some of its basic data structures (kernel pages/klock) during system initialization, but is not freed until the system is rebooted. These klock pages (data structures created during initiation) will be used to mange the operating system and its activity itself. These klock pages will be updated regularly. So, these pages will be considered important relative to other temporary allocated/destroyed kernel pages.

Further with regard to item (ix) in the list two paragraphs previous, in the "default page-in/page-out resolution mechanism," the page fault handler attempts to resolve page fault for a specific page and will try to access XPT root to determine a page-in in which the XPT DIRECT entry is present. Once it gets the page address in which XPT DIRECT entry is present, then the page fault handler tries to access that page to know which page in the XPT INDIRECT entry is present. Then, the page fault handler will access the page that contains the XPT INDIRECT entry to: (i) determine the location of the faulted page in a paging space; and then (ii) complete the page fault handling by setting up the I/O from the paging space. If a page fault did not get XPT root, XPT DIRECT, or XPT INDirect entry in memory results in a nested page fault, then the kernel needs to back track the previous page fault and resolve the current page fault.

Some embodiments of the present invention may include one, or more, of the following features, characteristics and/or advantages: (i) builds an association of critical situation and data/text pages required in particular situation and paging space metadata (XPT ROOT, XPT DIRECT, XPT INDIRECT entry); (ii) accesses only the XPT INDirect data block to locate data/text page in paging space and pre-fetches the appropriate data/text page; (iii) a "VMM self-page-in kernel daemon" pre-fetches only two (2) pages instead of four (4) pages (as in the default page fault mechanism); and/or (iv) handling of pages that are converted from their pinned form (that is, non-pageable form) into pageable form to satisfy the pinned memory demand.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Module/Sub-Module: any set of hardware, firmware and/or software that operatively works to do some kind of function, without regard to whether the module is: (i) in a single local proximity; (ii) distributed over a wide area; (ii) in a single proximity within a larger piece of software code; (iii) located within a single piece of software code; (iv) located in a single storage device, memory or medium; (v) mechanically connected; (vi) electrically connected; and/or (vii) connected in data communication.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

Important pages: any unpinned page that has been designated, or conditionally designated, under any machine logic based rule, for pre-fetching to the kernel memory space.

What is claimed is:

1. A method comprising:
    receiving historical processing data including information indicative of historical processing executed by a computer system, with the historical processing including a first backtracking error;
    determining, by machine logic and based on the historical processing data, a first important page that caused the first backtracking error by being absent from kernel memory space;
    establishing a first machine logic-based rule, with the first machine logic-based rule including a first triggering condition and a first consequential responsive action;
    determining that the first triggering condition has occurred; and
    in response to the determination that the first triggering condition has occurred, performing the first consequential responsive action;
    wherein:
    the first triggering condition is that the first important page of the computer system has been paged out of kernel memory space and is currently paged into paging memory space; and
    the first consequential responsive action includes the following:
        paging the first important page from paging memory space back into kernel memory space.

2. A computer program product comprising:
    a computer readable storage medium structured and connected to store machine computer code in a manner so that the machine computer code can be executed by a processor set comprising one or more processors; and
    computer code stored in the computer readable storage medium, with the computer code including code for causing the processor set to perform operations including at least the following:
        receiving historical processing data including information indicative of historical processing executed by a computer system, with the historical processing including a first backtracking error;
        determining, by machine logic and based on the historical processing data, a first important page that caused the first backtracking error by being absent from kernel memory space;
        establishing a first machine logic-based rule, with the first machine logic-based rule including a first triggering condition and a first consequential responsive action;
        determining that the first triggering condition has occurred; and
        in response to the determination that the first triggering condition has occurred, performing the first consequential responsive action;
    wherein:
    the first triggering condition is that the first important page of the computer system has been paged out of kernel memory space and is currently paged into paging memory space; and
    the first consequential responsive action includes the following:
        paging the first important page from paging memory space back into kernel memory space.

3. A computer system comprising:
    a processor set comprising one or more processors;
    a computer readable storage medium structured and connected to store machine readable computer code in a manner so that the machine computer code can be executed by the processor set; and computer code stored in the computer readable storage medium, with the computer code including code for causing the processor set to perform operations including at least the following:

receiving historical processing data including information indicative of historical processing executed by a computer system, with the historical processing including a first backtracking error;

determining, by machine logic and based on the historical processing data, a first important page that caused the first backtracking error by being absent from kernel memory space;

establishing a first machine logic-based rule, with the first machine logic-based rule including a first triggering condition and a first consequential responsive action;

determining that the first triggering condition has occurred; and in response to the determination that the first triggering condition has occurred, performing the first consequential responsive action;

wherein:

the first triggering condition is that the first important page of the computer system has been paged out of kernel memory space and is currently paged into paging memory space; and the first consequential responsive action includes the following:

paging the first important page from paging memory space back into kernel memory space.

* * * * *